May 30, 1950     H. S. BROCHNER     2,509,288
EMULSIFYING APPARATUS
Filed June 19, 1948
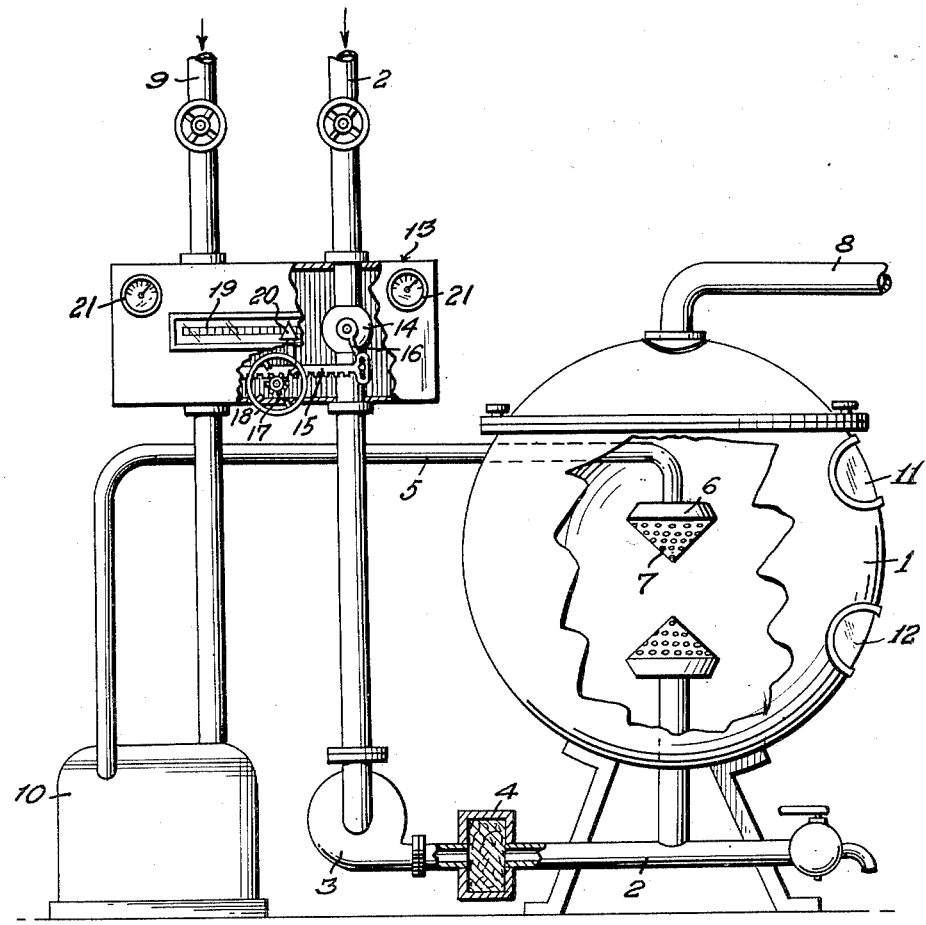
Inventor
Henry S. Bröchner
By Glascock Downing Siebold
Attorneys Patented May 30, 1950

2,509,288

UNITED STATES PATENT OFFICE 2,509,288

EMULSIFYING APPARATUS

Henry Secher Bröchner, Copenhagen, Denmark, assignor to International Morfat Corporation, Copenhagen, Denmark Application June 19, 1948, Serial No. 33,961
In Denmark January 2, 1947

5 Claims. (Cl. 259—4)

The present invention relates to an emulsifier, i. e., an apparatus for the dispersion of a liquid phase into another liquid phase or for increasing the amount of the disperse phase in a "thin" emulsion, that is, an emulsion with a relatively low content of the disperse phase. The dispersion is effected under a suitable pressure.

Since known emulsifiers require rather stable conditions of operation in order to yield a satisfactory product, the present invention has for an object to provide an emulsifier capable of working in a satisfactory manner under varying operating conditions.

An additional object is to provide an emulsifier having special adjustment controls through which a constant regulation of the fat content of the finished product, produced in the apparatus, can be maintained.

A characteristic feature of the emulsifying apparatus according to the present invention is constituted by an emulsifying chamber containing a liquid. Into the said chamber there project two nozzles, one for feeding the chamber with a liquid (of a continuous phase) under such conditions that the said liquid is maintained in a state of active movement or agitation in the chamber, and the other for feeding the disperse phase, for instance, a fatty substance or an oleaginous substance, so that it is atomized on entering the chamber. This action will cause the formation of an oil-in-water emulsion.

The emulsifying chamber may be of any convenient shape and the said nozzles may be disposed in a suitable manner in relation to each other. Thus, according to the invention, the liquid feed nozzles may be provided in the lower part of the chamber, whereas the oil feed nozzles are provided in the upper part of the chamber, with the discharge passage being provided in or near the ceiling of the chamber. This will make it possible to inject the fat or the fatty substance into the liquid in a direction opposite to the main direction of flow of the liquid and towards the liquid nozzle where the agitation of the liquid in the chamber is greatest.

Very substantial results have proved obtainable when the chamber, according to the invention, is designed as an upright cylinder and the two groups of nozzles are so disposed that the ratio of the distance between the nozzle groups and the diameter of the chamber is about 3.

In order to ensure the most favorable conditions for the process of emulsification, the emulsifying chamber may, according to the invention, be provided with a built-in heating element to maintain the temperature of the chamber at a constant level.

As referred to in the foregoing, the emulsifier according to the invention is capable of working within a rather wide scope and, according to the invention, the apparatus may be provided with a special control or regulating device to regulate the ratio between the two liquid phases. The said regulating device is constituted by two valves coupled together and mounted in the respective feed pipes for the liquid and the fat. The said valves are controlled by a common operating device as, for example, a hand wheel, the adjustment of which will cause one of the coupled valves to move towards its fully open position, and the other one to move towards its fully closed position. By means of the said common operating device it is thus possible to establish a constant and simultaneous regulation of the fat and liquid feed so that the finished product leaving the emulsifier has the desired content of the disperse phase.

The drawing shows an emulsifier designed in accordance with the present invention, but the apparatus may, of course, also be given many other forms of construction within the scope of the appended claims.

The apparatus includes a cylindrical chamber 1 in which the process of emulsification is effected. Through a pipe or conduit 2 and a centrifugal pump 3 and a filter 4, a liquid, for example a "thin" oil emulsion, is jetted through a nozzle projecting into the bottom end of the chamber 1 under a pressure sufficient to fill the chamber and maintain a state of agitation in the interior thereof. A pipe 5 connected to the upper end of the chamber 1 conveys oil or fat to an atomizer head 6 and through nozzle 7 that projects into the chamber and from which the oil is injected under pressure or jetted into the thin emulsion in the chamber so as to be atomized and thus emulsified in the thin emulsion occupying the entire chamber 1.

As shown the pipes projecting into the chamber and terminating in the discharge nozzles have a common axis. Each nozzle or atomizer head is provided with a plurality of series of jet openings arranged circumferentially of the heads and concentric of the common axis of the pipes. As stated previously, to obtain excellent results the ratio between the distance encompassed by the height or diameter of the chamber 1 and the distance between the heads is approximately 3 to 1.

The oil is comminuted on leaving the nozzle 7 as a consequence of the influence of surface tension so that each jet issuing from an opening in the nozzle is parted into drops which are intimately mixed with the agitated liquid in the chamber. Owing to the agitation the thin emulson is very intimately mixed and the "vigorous" (richer-in-oil) emulsion leaves the chamber 1 through a pipe 8 at the top. The oil or fat is supplied to the chamber through a pipe 9 connected with a compressor or pressure pump 10 in which the oil is put under pressure.

The emulsifying chamber 1 may be provided with heating elements, or these may be mounted in the wall of the chamber, and by means of a thermostat a constant temperature of the fluid in the chamber may be maintained. It will be advantageous to preheat the substances before conveying them to the pipes 2 and 9.

Through windows 11 and 12 provided in the outer wall of the chamber 1 the emulsifying process in the interior of the chamber may be constantly watched.

Adjustment of the proper proportion between the liquid fed through the pipe 2 and the liquid fed through the pipe 5 is effected by means of a regulating mechanism 13 comprising a pair of valves coupled together and mounted on the pipes 2 and 9, only one of these valves, however, namely the valve 14, being indicated on the drawing. Each of the said two valves is provided with a valve lever 16 connected to a common rack 15, the longitudinal movement of which will cause the valves to open and close in such a way that the one valve will move towards its fully open position while the other one moves towards its fully closed position. The rack 15 is moved by means of a small gear wheel 17 mounted on the same shaft as an outside hand wheel 18, and thereby the liquid feed can be regulated by turning the hand wheel 18. In this simple manner it is thus possible to regulate the content of the finished product. In order to control the position of the rack 15 there is provided a scale 19 along which moves a pointer 20 fitted to the rack 15. This scale may, for example, have calibrations directly indicating the percentage of mixture of the finished product. Moreover, the regulating mechanism 13 is provided with two small thermometers 21 which render it possible to maintain a constant control of the media flowing through the pipes 2 and 9.

On emptying the emulsifying chamber the supply of oil or fat fed through the pipe 5 may be cut off, air being subsequently forced into the chamber, either through the pipe 2 or through a separate pipe, not shown on the drawing, communicating with the bottom of the chamber 1.

Having now described my invention, what I claim as new and desire to secure by Letters Patent is:

1. In an apparatus for producing an emulsion, the combination of a chamber; a pipe projecting into said chamber; a second pipe projecting into said chamber, said pipes having a common axis in said chamber; an atomizer head mounted on the end of each of said pipes in said chamber, said heads being spaced from one another and each having a plurality of series of minute openings, said series being arranged circumferentially of said heads and concentric of said axis; means for supplying two emulsifiable liquids under pressure to said chamber through said pipes and their heads, respectively the liquid from one pipe filling the chamber and being kept agitated by being discharged as jets through the openings of the corresponding head and the liquid from the other pipe being comminuted on leaving the corresponding head as a consequence of the influence of surface tension on the thin jets leaving the openings in the head of said other pipe so that each jet is parted into drops and intimately mixes with the agitated liquid in the chamber; and draw off means disposed above both said heads for evacuating the emulsion from said chamber.

2. An apparatus according to claim 1 in which said heads are disposed in the upper and lower portions of said chamber, respectively.

3. An apparatus according to claim 1 in which the height of said chamber and the distance between said heads have a ratio of approximately 3 to 1.

4. An apparatus according to claim 1 in which said supplying means are provided with a common regulating means whereby the relative proportions of the liquids supplied to said chamber are determinable.

5. An emulsifying apparatus comprising a chamber, liquid supply means for respectively supplying two emulsifiable liquids including a supply conduit extending into said chamber terminating in a discharge nozzle having a plurality of circumferentially spaced series of minute openings therein, a valve in said conduit exteriorly of said chamber for controlling the quantity of fluid passing therethrough, a centrifugal pump interposed in said conduit between said valve and said chamber, and filter means interposed in said conduit between said pump and said chamber, and a second conduit extending into said chamber in axial alignment with said first conduit and terminating in a discharge nozzle having a plurality of circumferentially spaced series of minute openings therein, a valve in said conduit exteriorly of said chamber, and a pressure pump in said conduit between said valve and said chamber, the liquid from one of said conduits jetting through the respective nozzle on the end thereof within said chamber and filling said chamber and being maintained in a state of agitation by the jet discharging from the nozzle and the liquid from said other conduit jetting into said chamber through the openings in the respective nozzle, the said liquid being comminuted on leaving the nozzle as a consequence of the influence of surface tension on the thin jets so that each jet issuing from the opening in the nozzle is parted into drops and intimately mixed with the agitated liquid in the chamber, a draw off conduit connected to said chamber for continuously evacuating the emulsion produced in the chamber, and proportioning means respectively connected to both said valves and including a common operating member whereby when one valve is closed the other valve is opened to regulate the proportion of the liquid entering the chamber through the respective nozzles.

HENRY SECHER BRÖCHNER.

REFERENCES CITED

The following references are of record in the file of this patent:

UNITED STATES PATENTS

| Number | Name | Date |
| --- | --- | --- |
| 1,154,868 | McHenry | Sept. 28, 1915 |
| 1,842,877 | Muller et al. | June 26, 1932 |
| 1,941,808 | McConnaughay | Jan. 2, 1934 |
| 2,277,120 | Lindsey | Mar. 24, 1942 |

FOREIGN PATENTS

| Number | Country | Date |
| --- | --- | --- |
| 57,144 | Denmark | Oct. 2, 1937 |